(12) United States Patent
Denys

(10) Patent No.: US 6,273,931 B1
(45) Date of Patent: Aug. 14, 2001

(54) METHOD FOR CONTROLLING A SMELTING REDUCTION PROCESS

(75) Inventor: Mark Bernard Denys, Noordwijkerhout (NL)

(73) Assignee: Corus Staal BV, Ijmuiden (NL)

(*) Notice: Subject to any disclaimer, the term of this patent is extended or adjusted under 35 U.S.C. 154(b) by 0 days.

(21) Appl. No.: 09/423,227

(22) PCT Filed: Jul. 3, 1998

(86) PCT No.: PCT/EP98/04186

§ 371 Date: Feb. 4, 2000

§ 102(e) Date: Feb. 4, 2000

(87) PCT Pub. No.: WO99/02739

PCT Pub. Date: Jan. 21, 1999

(30) Foreign Application Priority Data

Jul. 11, 1997 (NL) .................................................. 1006553

(51) Int. Cl.$^7$ .................................................. C21B 11/00
(52) U.S. Cl. .................................. 75/376; 75/385; 75/453
(58) Field of Search .............................. 75/453, 385, 376

(56) References Cited

U.S. PATENT DOCUMENTS 5,800,592 * 9/1998 den Hartog et al. .................. 75/453

FOREIGN PATENT DOCUMENTS

| 0384395 | 8/1990 | (EP) . |
| 0690136 | 1/1996 | (EP) . |
| 6506507 | 11/1965 | (NL) . |

OTHER PUBLICATIONS

Patent Abstracts of Japan, vol. 014, No. 043, Jan. 26, 1990 for JP 01275711, published Nov. 6, 1989.
Patent Abstracts of Japan, vol. 013, No. 595, Dec. 27, 1989 for JP 01252715, published Oct. 9, 1989.

* cited by examiner

Primary Examiner—Melvyn Andrews
(74) Attorney, Agent, or Firm—Steven, Davis, Miller & Mosher, LLP

(57) ABSTRACT

Method for controlling a smelting reduction process, in particular a cyclone converter furnace process for producing pig iron, characterized in that one:

- measures the carbon fraction C in the off-gas in the form of CO and $Co_2O$;
- measures the hydrogen fraction $H_2$ in the off-gas in the form of $H_2$ and $H_2O$;
- determines the $C/H_2$ ratio in the off-gas;
- compares the $C/H_2$ ratio thus determined in the off-gas against the $C/H_2$ ratio prevailing for the coal being supplied, and
- adjusts the coal supply based on the difference found in the $C/H_2$ ratios in the off-gas and the coal being supplied.

17 Claims, 2 Drawing Sheets

METHOD FOR CONTROLLING A SMELTING REDUCTION PROCESS

The invention relates to a method for controlling a smelting reduction process, in particular a cyclone converter furnace process for producing pig iron.

A smelting reduction process of the cyclone converter furnace process type is known for example from EP-A 0 690 136.

The object of the invention is to create a method for controlling a smelting reduction process.

With the invention this is achieved by:
measuring the carbon fraction C in the off-gas in the form of CO and $CO_2$;
measuring the hydrogen fraction $H_2$ in the off-gas in the form of $H_2$ and $H_2O$;
determining the $C/H_2$ ratio of the carbon fraction C and the hydrogen fraction $H_2$ in the off-gas;
comparing the $C/H_2$ ratio thus determined in the off-gas against the $C/H_2$ ratio prevailing for the coal being supplied, and
adjusting the coal supply based on the difference found in the $C/H_2$ ratios in the off-gas and the coal being supplied such that the fraction of char formed from the coal in the slag layers kept stable, the said fraction being not much less than 20%.

The advantage of this is that the char consumption of the smelting reduction process can be monitored on-line and that the coal supply of the smelting reduction process can be controlled automatically.

Preferably the $C/H_2$ ratio of the coal supplied is corrected for the carbon lossed by the conveyance by the off-gas, for the carbon dissolved in the pig iron, for carbon and/or hydrogen introduced together with additives, and for hydrogen introduced by water injection into the off-gas system before the sampling point. This achieves even better control of the process.

Preferably the coal supply is adjusted while lance height, ore and oxygen supply remain the same. The advantage of this is that the process runs stably.

The invention will be illustrated for the Cyclone Converter Furnace (CCF) process by reference to the drawings. However, the invention can also be applied with other smelting reduction processes, such as for example the AISI process and the DIOS process.

Figure 1:
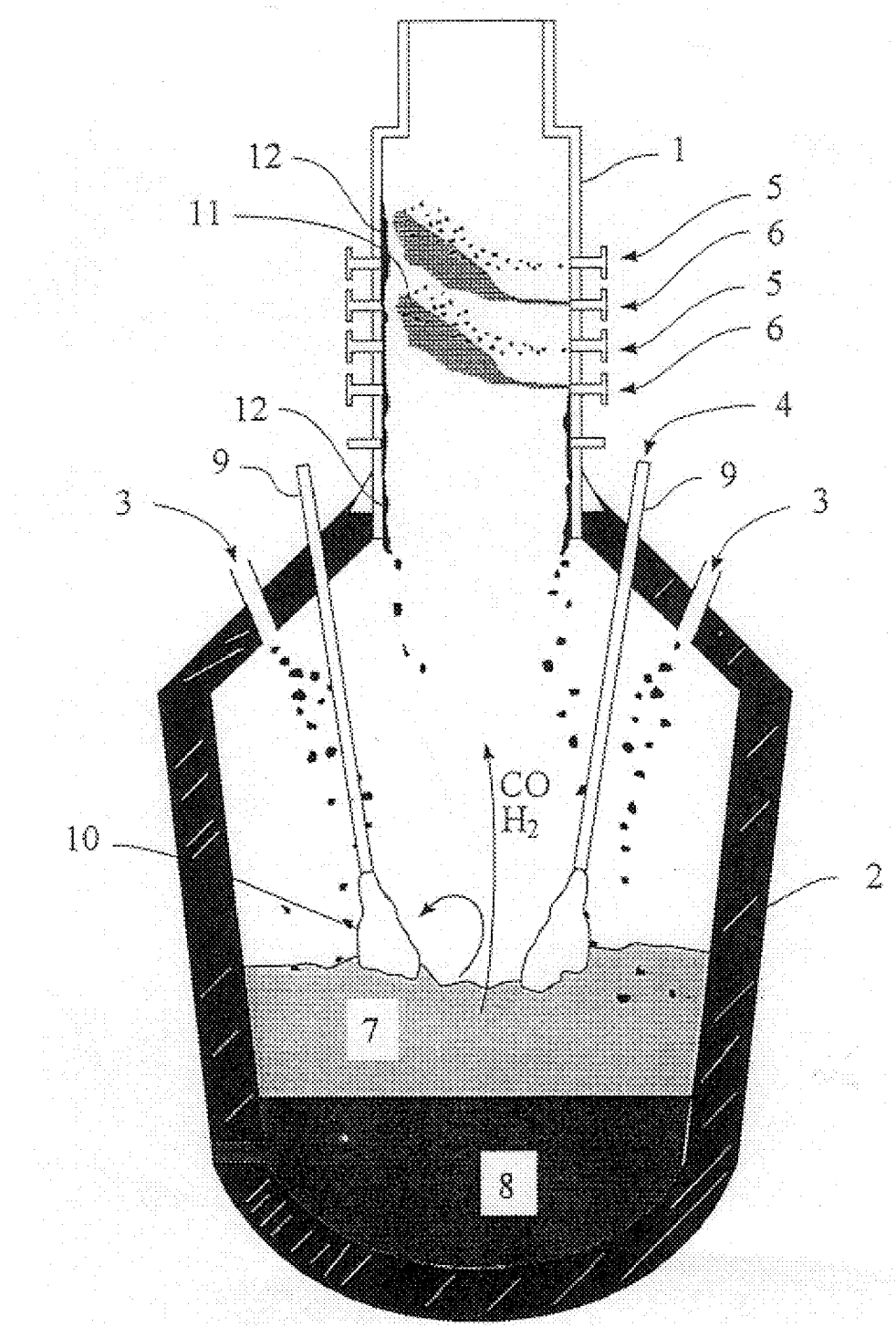
FIG. 1 shows a CCF reactor.

In the production of pig iron by the CCF process the iron ore, often in the form of $Fe_2O_3$, is prereduced into FeO in a smelting cyclone (1). A final reduction of FeO into iron (Fe) takes place in the converter vessel (2).

With the CCF the smelting cyclone (1) is placed on top of a converter shaped smelting vessel (2). Coal (3) is fed into the smelting vessel and partially gasifed by combustion at position (10) with oxygen (4) being supplied through lance or lances (9). The off-gases rise towards the cyclone. In the cyclone iron ore (5) and oxygen (6) are blown in tangentially. The oxygen reacts with a part of the CO and $H_2$ present in the spent gas thereby releasing heat. The injected ore particles are blown through the combustion hearths in the cyclone and melt instantaneously. At position (11) in the cyclone the molten ore is prereduced into FeO according to the chemical reactions:

$$3Fe_2O_3 + CO(H_2) <-> 2Fe_3O_4 + CO_2(H_2O)$$

$$Fe_3O_4 + CO(H_2) <-> 3FeO + CO_2(H_2)$$

The prereduced molten ore (12) drips out of the cyclone onto the slag layer (7) in the smelting vessel underneath. The ore drops dissolve in the slag. In the slag layer the final reduction into iron takes place according to the net chemical reaction:

$$FeO + C_{solid} <-> Fe_{liquid} + CO$$

The carbon consumed in this reaction is supplemented by means of introducing coal into the slag layer. Volatile components in the coal evaporate directly out as a consequence of the prevailing high temperature, and a form of carbon, known as char, remains behind in the slag.

The char has a three-fold function in the slag:
1. it is the means of reduction for the final reduction of the iron oxides into iron;
2. it is the fuel for supplying the necessary heat for enabling the reduction to run and for smelting the iron ore;
3. it has a stabilising effect on the foaming of the molten slag layer. For this the char mass fraction in the slag should not be much less than 20%.

In functions 1 and 2 char is consumed, while in function 3 it is attempted to keep the char fraction in the slag as constant as possible.

Functions 1, 2 and 3 can be united with one another by keeping the char supply equal to the char consumption. However, the char originates from the coal, and in addition to the occurrence of char, the volatile constituents escape from the coal as a consequence of the prevailing high temperature. In their turn the volatile constituents again make a contribution to the function (2) of the char.

Carbon and hydrogen often represent the main components from which the volatile constituents in the coal are composed.

For the smelting bath process the following apply (see FIG. 2):

$$\phi_{C.coal\ in} + \phi_{C.flux\ in} = \phi_{C.gas\ out} + dC_{slag}/dt + \phi_{C.Fe} + \phi_{C.dust\ out} + \phi_{C.slag}\ \text{carbon mass balance}$$

$$\phi_{H2.coal\ in} + \phi_{H2.water\ in} = \phi_{H2.flux\ in} + \phi_{H2.gas\ out}\ \text{hydrogen mass balance}$$

where:

$\phi_{C.coal\ in}$ is the quantity of carbon introduced with the coal;

$\phi_{H2.coal\ in}$ is the quantity of hydrogen introduced with the coal;

$\phi_{C.gas\ out}$ is the total of carbon in CO and $CO_2$ in the off-gas. This carbon originates from the combustion of the volatile hydrocarbons and the char in the slag and the consumption of the char for the final reduction of the iron ore and any carbon fractions in the dosed additives;

$\phi_{C.Fe}$ is the quantity of carbon absorbed per unit of time in the newly formed iron;

$\phi_{C.slag}$ is the quantity of carbon absorbed per unit of time in the newly formed slag;

$\phi_{C.dust\ out}$ is the quantity of carbon leaving the CCF reactor as fine dust;

$\phi_{C.flux\ in}$ is the carbon entering the CCF reactor as a consequence of the additive dosing (for example $CaCO_3$);

$\phi_{H2.gas\ out}$ is the total quantity of hydrogen in the form of $H_2O$ and $H_2$ in the off-gas. This hydrogen originates from the volatile hydrocarbons in the coal, form hydrogen in any additives, and (possible) cooling water introduced;

$\phi_{H2.water\ in}$ is the quantity of hydrogen in the form of water that is used for (possible) direct cooling of the hot gas in the gas line;

$\phi_{H2.flux\ in}$ is the hydrogen entering the CCF reactor as a consequence of the dosing of additives;

It should be noted that other sources of supply and loses for C and $H_2$ are possible, such as for example by contamination of air and by water of the refractory lining of the metallurgical vessels. However, these are generally of minor significance. If desired they may be taken in account in similar way.

Figure 2:
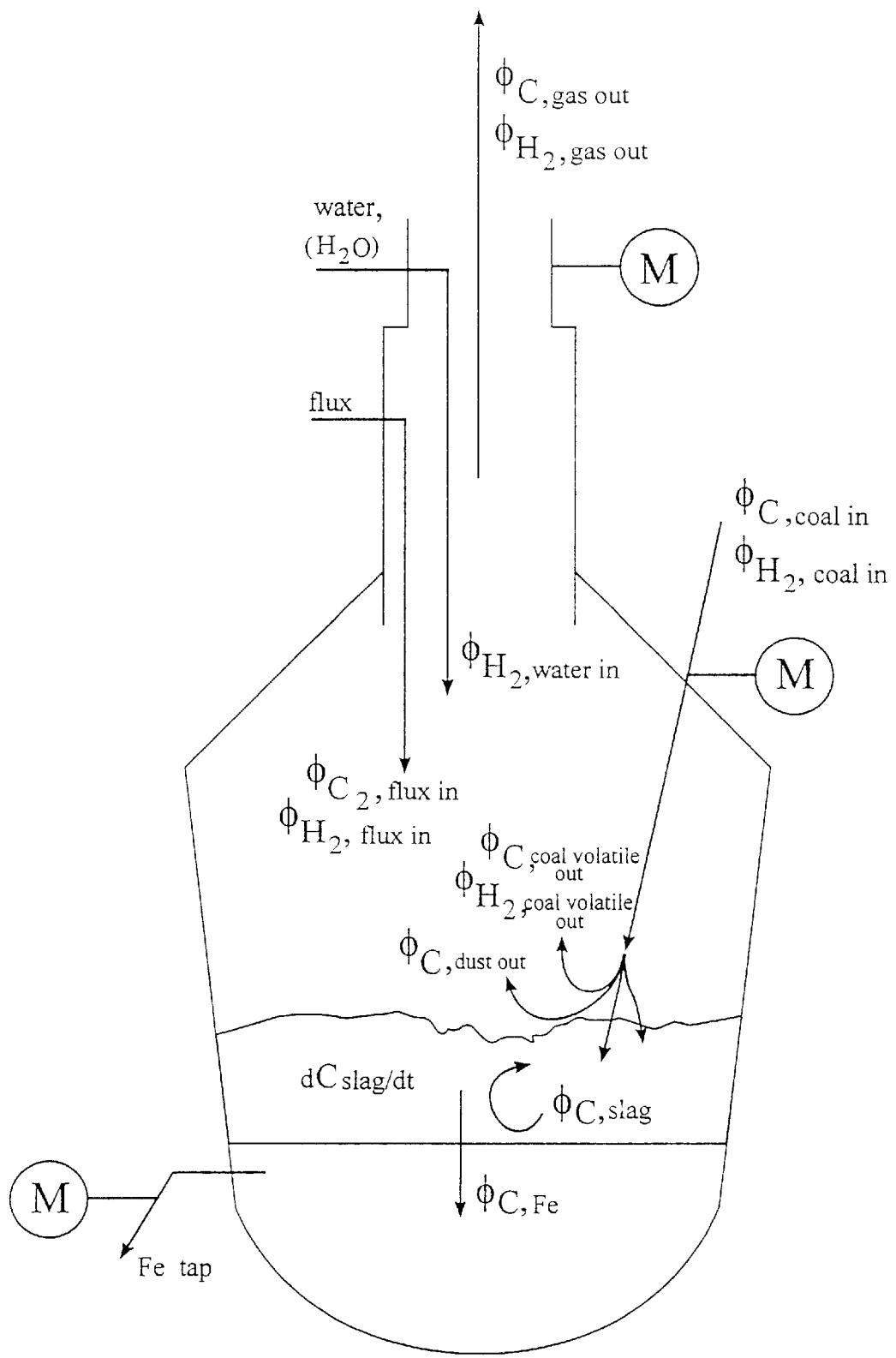
FIG. 2 shows the carbon and hydrogen balance across the CCF reactor.

The M in FIG. 2 represents a sampling or a measuring point.

Control of coal dosing according to the $C/H_2$ ratio

In a smelting reduction process (such as the CCF converter) the internal conditions vary as the process runs because the slag/metal bath (7), (8) increases as the process runs. These variations affect the behaviour of the reactor. Moreover, the bath process has possible run-off effects such as by excessive slag foaming and by solidification of the molten slag.

Essential aspects for the stable operation of a smelting reduction bath process are:

a stable carbon fraction in the metal bath;

maintaining a stable slag height, that is to say preventing excessive slag foaming, so-called "slopping".

For this it is of essential importance to have good control over the char fraction in the slag. When sufficient char is present this makes the small gas bubbles coalesce and prevents slopping. The extreme conditions in the converter make it difficult to measure directly and reliably the internal process conditions such as the char fraction. Consequently, controlling the reactor is preferably based (as much as possible) on externally measurable quantities (such as off-gas composition). The bath process can be well controlled as soon as the char fraction is under control.

For this the operator has available the following control parameters:

the raw material supply (coal, ore, additives);

oxygen flow rate;

the lance height (=the distance between the lance head and the slag layer).

In the following a method is proposed with which changes in char consumption may be monitored in a simple manner, and the coal dosing controlled in such a way that the char mass remains stable in the converter.

Coal consists essentially of graphite and volatile constituents (hydrocarbons). When coal is dosed in the bath process, the hydrocarbons evaporate directly out. The high temperature makes the hydrocarbons break down and they go into the off-gas as $H_2$, $H_2O$, CO and $CO_2$. The product (char) remaining in the slag consists essentially of graphite. This char is consumed by the reduction reactions and the direct combustion with oxygen. Both reactions produce CO and $CO_2$. The hydrogen fraction in the off-gas (in the form of $H_2$ and $H_2O$) is consequently only a function of the coal type used and the quantity of coal being supplied. In addition the carbon fraction (in the form of CO and $CO_2$) is also a function of the char consumption. Monitoring the ratio between the carbon fraction and the hydrogen fraction in the off-gas therefore produces a direct indication of changes in the char consumption of the bath process.

A stable char mass is essential for running the bath process. Thereby the $C/H_2$ ratio in the off-gas can serve for automatically controlling the coal supply. This requires reliable sampling of the off-gas from the converter. In this case account must be taken of any carbon and hydrogen fractions in the other raw materials. In addition account must be taken of two phenomena which contribute to the reduction of char mass in the converter; char dust loss through the off-gas line and carbon dissolving in the metal bath. At the same time enough char needs to be formed for the char fraction in the quantity of newly formed slag to be equal to the fraction of the slag already present in the converter. The phenomena can be controlled by regulating the coal supply in such a way that the $C/H_2$ ratio in the off-gas is equal to a corrected $C/H_2$ ratio. Were these phenomena not present, then coal dosing would be equal to coal consumption if the $C/H_2$ ratio in the off-gas was equal to that of the coal being supplied. An example is given below of the calculation of the corrected $C/H_2$ ratio.

The forming of char dust is essentially determined by the dust already present in the coal being supplied and the type of coal (decisive for the break-up behaviour during degassing). The dust loss can reach up to 15%. However, in the CCF process a part of the char dust will combust in the smelting cyclone.

To prevent possible reduction of the char fraction in the slag through dust losses, calculating the corrected $C/H_2$ ratio is best based on the maximum dust loss. During the process cycle, when there is a smaller dust loss, a slight increase in char occurs in the converter (see example). However, the char fraction in the slag will remain relatively unchanged because of the slag layer growing. In order to correct for any over high char fraction in the remaining slag following a (partial) tapping of metal and slag, it is possible to adjust the coal supply for a brief time downward and allow char to burn out. The char fraction is then lowered enough to permit proceeding with controlling the coal supply according to the $C/H_2$ ratio.

The quantity of C in the pig iron can be determined by regularly taking a sample from the produced (tapped) pig iron and determining the carbon content in it. An extra correction to the desired $C/H_2$ ratio is also necessary when dosed additives (for example $CaCO_3$) and possibly water injection introduce extra carbon and/or hydrogen into the off-gas (see example).

EXAMPLE

Calculating the $C/H_2$ ratio

This example gives a calculation of the corrected $C/H_2$ ratio. The calculation is based on (RY=pig iron):

a 0.7 million ton RY/year installation;

production rate 90 tons RY/hour, tapping every hour;

coal consumption 600 kg/ton RY, mid-volatile coal;

a maximum char dust loss of 15% of the dosed coal mass;

carbonising the pig iron bath up to a mass Fraction of 4.5%.

Analysis of mid-volatile coal (mass fractions):

| | |
|---|---|
| volatile constituents | 20% |
| fixed carbon (graphite) | 70% |
| minerals | 5% |
| moisture | 5% |

Dry ash-free analysis (90% of total mass)

| | |
|---|---|
| carbon | 90% |
| hydrogen | 5% |
| remainder | 5% |

Calculation of the desired $C/H_2$ ratio in the off-gas
$H_2$ as hydrocarbon in 600 kg coal=0.9×0.05×600=27 kg $H_2$=13.5 kmol $H_2$
extra $H_2$ from moisture in 600 kg=0.05×600=30 kg $H_2O$= 1.7 kmol $H_2$
total $H_2$ in 600 kg coal=15.2 kmol $H_2$
total C in 600 kg coal=0.9×0.9×600=486 kg C=40.5 kmol C
$C/H_2$ in dosed coal=40.5/15.2=2.66
maximum dust loss per 600 kg coal=0.15×600=90 kg char=7.5 kmol C
carbonising the pig iron per ton=0.045×1000=45 kg C=3.75 kmol C
corrected $C/H_2$ ratio for controlling according to converter off-gas
$C/H_2$=(40.5−7.5−3.75)/15.2=1.92
limestone dosing in cyclone=170 kg/ton RY=1.7 kmol C
corrected $C/H_2$ ratio for controlling according to cyclone off-gas:
$C/H_2$=(40.5−7.5−3.75+1.7)/15.2=2.04

What is claimed is:

1. A method for controlling a smelting reduction process for producing pig iron wherein oxide iron material, coal and oxygen are supplied and an off gas is produced, comprising the steps of:
   measuring the carbon fraction C in the off-gas in the form of CO and $CO_2$
   measuring the hydrogen fraction $H_2$ in the off-gas in the form of $H_2$ and $H_2O$;
   determining the $C/H_2$, ratio in the off-gas;
   comparing the $C/H_2$ ratio determined in the off-gas against the $C/H_2$ ratio prevailing for the coal being supplied, and
   adjusting the coal supply based on the difference found in the $C/H_2$ ratios in the off-gas and the coal being supplied such that the fraction of char formed from the coal in a slag layer is kept stable, the fraction being not much less than 20%.

2. The method in accordance with claim 1, wherein the $C/H_2$ ratio of the coal supplied is corrected for the carbon losses by the conveyance by the off-gas.

3. The method in accordance with claim 1, wherein the $C/H_2$ ratio of the coal supplied is corrected for the carbon dissolved in the pig iron.

4. The method in accordance with claim 1 wherein the $C/H_2$ ratio of the coal supplied is corrected for carbon and/or hydrogen introduced together with additives.

5. The method in accordance with one of the claims 1 wherein the $C/H_2$ ratio of the coal supplied is corrected for hydrogen introduced by water injection into the off-gas system before the sampling point.

6. The method in accordance with claim 1, wherein the oxygen is supplied through at least one lance into a vessel, the coal is supplied to the vessel and the oxide iron material as ore is supplied to the vessel, and the coal supply is adjusted while lance height, ore and oxygen supply remain constant.

7. The method in accordance with claim 1, wherein the smelting reduction process is a cyclone converter furnace process for producing pig iron.

8. The method in accordance with claim 2, wherein the $C/H_2$ ratio of the coal supplied is corrected for the carbon dissolved in the pig iron.

9. The method in accordance with claim 2, wherein the $C/H_2$ ratio of the coal supplied is corrected for carbon and/or hydrogen introduced together with additives.

10. The method in accordance with claim 2, wherein the $C/H_2$ ratio of the coal supplied is corrected for hydrogen introduced by water injection into the off-gas system before the sampling point.

11. The method in accordance with claim 2, wherein the oxygen is supplied through at least one lance into a vessel, coal is supplied to the vessel and oxide iron material as ore is supplied to the vessel, and the coal supply is adjusted while lance height, ore and oxygen supply remain constant.

12. The method in accordance with claim 2, wherein the smelting reduction process is a process for producing pig iron.

13. The method in accordance with claim 2, wherein the smelting reduction process is a cyclone converter furnace process for producing pig iron.

14. The method in accordance with claim 3, wherein the $C/H_2$ ratio of the coal supplied is corrected for carbon and/or hydrogen introduced together with additives.

15. The method in accordance with claim 3, wherein the $C/H_2$ ratio of the coal supplied is corrected for hydrogen introduced by water injection into the off-gas system before the sampling point.

16. The method in accordance with claim 3, wherein the oxygen is supplied through at least one lance into a vessel, coal is supplied to the vessel and oxide iron material as ore is supplied to the vessel, and the coal supply is adjusted while lance height, ore and oxygen supply remain constant.

17. The method in accordance with claim 3, wherein the smelting reduction process is a cyclone converter furnace process for producing pig iron.

* * * * *